(12) United States Patent
Ding et al.

(10) Patent No.: US 10,599,913 B2
(45) Date of Patent: *Mar. 24, 2020

(54) FACE MODEL MATRIX TRAINING METHOD AND APPARATUS, AND STORAGE MEDIUM

(71) Applicant: TENCENT TECHNOLOGY (SHENZHEN) COMPANY LIMITED, Shenzhen (CN)

(72) Inventors: Shouhong Ding, Shenzhen (CN); Jilin Li, Shenzhen (CN); Chengjie Wang, Shenzhen (CN); Feiyue Huang, Shenzhen (CN); Yongjian Wu, Shenzhen (CN); Guofu Tan, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/509,091

(22) Filed: Jul. 11, 2019

(65) Prior Publication Data

US 2019/0332847 A1 Oct. 31, 2019

Related U.S. Application Data

(63) Continuation of application No. 15/703,826, filed on Sep. 13, 2017, now Pat. No. 10,395,095, which is a (Continued)

(30) Foreign Application Priority Data

Nov. 26, 2015 (CN) .......................... 2015 1 0836591

(51) Int. Cl.
*G06K 9/00* (2006.01)
*G06K 9/62* (2006.01)
*G06K 9/64* (2006.01)

(52) U.S. Cl.
CPC .......... *G06K 9/00228* (2013.01); *G06K 9/00* (2013.01); *G06K 9/00214* (2013.01);
(Continued)

(58) Field of Classification Search
None
See application file for complete search history.

(56) References Cited

U.S. PATENT DOCUMENTS 7,856,123 B2 12/2010 Visani et al.
8,553,983 B2 10/2013 Imaoka
(Continued)

FOREIGN PATENT DOCUMENTS

CN 102129574 A 7/2011
CN 104573652 A 4/2015
(Continued)

OTHER PUBLICATIONS

The Japan Patent Office (JPO) Non-Final Office Action 1 for Application No. 2017-559544 dated Feb. 25, 2019 5 Pages. (including translation).
(Continued)

*Primary Examiner* — Soo Jin Park
(74) *Attorney, Agent, or Firm* — Anova Law Group, PLLC

(57) ABSTRACT

Face model matrix training method, apparatus, and storage medium are provided. The method includes: obtaining a face image library, the face image library including k groups of face images, and each group of face images including at least one face image of at least one person, k>2, and k being an integer; separately parsing each group of the k groups of
(Continued)

face images, and calculating a first matrix and a second matrix according to parsing results, the first matrix being an intra-group covariance matrix of facial features of each group of face images, and the second matrix being an inter-group covariance matrix of facial features of the k groups of face images; and training face model matrices according to the first matrix and the second matrix.

17 Claims, 4 Drawing Sheets

Related U.S. Application Data continuation of application No. PCT/CN2016/084526, filed on Jun. 2, 2016.

(52) U.S. Cl.
CPC ......... *G06K 9/6215* (2013.01); *G06K 9/6232* (2013.01); *G06K 9/64* (2013.01)

(56) References Cited

U.S. PATENT DOCUMENTS

| | | |
|---|---|---|
| 2009/0087036 A1 | 4/2009 | Imaoka |
| 2015/0310308 A1 | 10/2015 | Xiong et al. |
| 2016/0078314 A1 | 3/2016 | Nagayoshi |
| 2016/0125308 A1 | 5/2016 | Bonne et al. |

FOREIGN PATENT DOCUMENTS

| | | | |
|---|---|---|---|
| CN | 105095833 A | 11/2015 | |
| JP | 2004178569 A | 6/2004 | |
| JP | 2006338092 A | 12/2006 | |
| JP | 2007122097 A | 5/2007 | |
| JP | 2008077536 A | 4/2008 | |
| JP | 2013242825 A | 12/2013 | |
| WO | 2009143279 A1 | 11/2009 | |
| WO | WO-2010062268 A1 * | 6/2010 | ........... G06K 9/6259 |

OTHER PUBLICATIONS

Yosuke Yamada et al., "The Expression Recognition of Facial Images Using Higher-order Local Autocorrelation Features and Discriminant Analysis", ITE Technical Report, Japan, (S) the Institute of Image Information and Television Engineers, Feb. 3, 2003, vol. 27, No. 8 Issue, p. 145-148 Total 6 Pages.
Lin Cao et al., "Face recognition using the wavelet approximation coefficients and fisher's linear discriminant", 2012 5th International Congress on Image and Signal Processing. IEEE, Oct. 16, 2012, p. 1253-1256 Total 5 Pages.
Korean Intellectual Property Office (KIPO) Office Action 1 for 10-2017-7036769 dated Apr. 19, 2018 11 Pages (including translation).
The World Intellectual Property Organization (WIPO) International Searvch Report for PCT/CN2016/084526 dated Aug. 31, 2016 6 Pages (including translation).
Dong Chen et al., "Bayesian Face Revisited: A Joint Formulation", ECCV'12 Proceedings of the 12th European conference on Computer Vision—vol. Part III, pp. 566-579, Oct. 7-13, 2012, Florence, Italy.

* cited by examiner

FACE MODEL MATRIX TRAINING METHOD AND APPARATUS, AND STORAGE MEDIUM

RELATED APPLICATIONS

This application is a continuation application of U.S. patent application Ser. No. 15/703,826, filed on Sep. 13, 2017, and now U.S. Pat. No. 10,395,095 issued on Aug. 27, 2019. U.S. patent application Ser. No. 15/703,826 (now U.S. Pat. No. 10,395,095 issued on Aug. 27, 2019) is a continuation application of PCT Patent Application No. PCT/CN2016/084526, filed on Jun. 2, 2016, which claims priority to Chinese Patent Application No. 201510836591.0, entitled "FACE MODEL MATRIX TRAINING METHOD AND APPARATUS" filed on Nov. 26, 2015, all of the above-numerated applications are incorporated herein by reference in their entirety

FIELD OF THE TECHNOLOGY

The present disclosure generally relates to the field of computer technologies, and in particular, relates to a face model matrix training method and apparatus, and storage medium.

BACKGROUND OF THE DISCLOSURE

A face recognition technology generally includes two steps. First, features of a target face image are extracted. Second, a similarity is calculated between the extracted features and features in a reference face image.

Before calculating the similarity, a terminal first needs to calculate a face model matrix according to face images in a face image library, and then calculates the similarity between the extracted features and the features in the reference face image according to the calculated face model matrix. Conventionally, a terminal needs to perform calculation on all face images in a face image library, and obtains, through training according to calculation results, a face model matrix.

SUMMARY

Embodiments of the present disclosure provide a face model matrix training method, apparatus, and storage medium.

An aspect of the present disclosure provides a face model matrix training method, including:

obtaining a face image library, the face image library comprising k groups of face images, and each group of face images comprising at least one face image of at least one person, wherein k>2, and k is an integer;

separately parsing each group of the k groups of face images, and calculating a first matrix and a second matrix according to parsing results, the first matrix being an intra-group covariance matrix of facial features of each group of face images, and the second matrix being an inter-group covariance matrix of facial features of the k groups of face images; and training face model matrices according to the first matrix and the second matrix.

Another aspect of the present disclosure provides a face model matrix training apparatus, including:

a memory; and
a processor, coupled to the memory and configured to:
obtain a face image library, the face image library comprising k groups of face images, and each group of face images comprising at least one face image of at least one person, wherein k>2, and k is an integer;

separately parse each group of the k groups of face images, and calculate a first matrix and a second matrix according to parsing results, the first matrix being an intra-group covariance matrix of facial features of each group of face images, and the second matrix being an inter-group covariance matrix of facial features of the k groups of face images; and train face model matrices according to the first matrix and the second matrix calculated by the matrix calculator.

Another aspect of the present disclosure provides a non-volatile computer readable storage medium, comprising computer-executable program instructions for, when executed by a processor, performing a face model matrix training method, the method comprising:

obtaining a face image library, the face image library comprising k groups of face images, and each group of face images comprising at least one face image of at least one person, wherein k>2, and k is an integer;

separately parsing each group of the k groups of face images, and calculating a first matrix and a second matrix according to parsing results, the first matrix being an intra-group covariance matrix of facial features of each group of face images, and the second matrix being an inter-group covariance matrix of facial features of the k groups of face images; and training face model matrices according to the first matrix and the second matrix.

In the embodiments of the present disclosure, face images in a face image library are divided into k groups, a face image in only one group is loaded to a memory each time and parsed, then a first matrix and a second matrix are calculated according to the parsing results, and face model matrices are trained according to the first matrix and the second matrix. As such, the technical problems, that relatively large memory is occupied when a terminal loads all face images in a face image library to a memory at the same time, is avoided. As disclosed, each time, face image(s) in only one group may be loaded to a memory, thereby reducing memory that needs to be occupied in a training process. In addition, because each time, only face image(s) in one group needs to be parsed, computational complexity of a terminal is also reduced.

BRIEF DESCRIPTION OF THE DRAWINGS

To describe the technical solutions of the embodiments of the present disclosure more clearly, the following briefly describes the accompanying drawings. Apparently, the accompanying drawings in the following description show only some embodiments of the present disclosure, and a person of ordinary skill in the art may derive other drawings from these accompanying drawings without creative efforts.

DESCRIPTION OF EMBODIMENTS

To make the objective, technical solutions, and advantages of the present disclosure clearer, the present disclosure is further described in detail below with reference to the accompanying drawings. Apparently, the described embodiments are merely some embodiments rather than all embodiments of the present disclosure. All other embodiments obtained by a person of ordinary skill in the art based on the embodiments of the present disclosure without creative efforts shall fall within the protection scope of the present disclosure.

Figure 1:
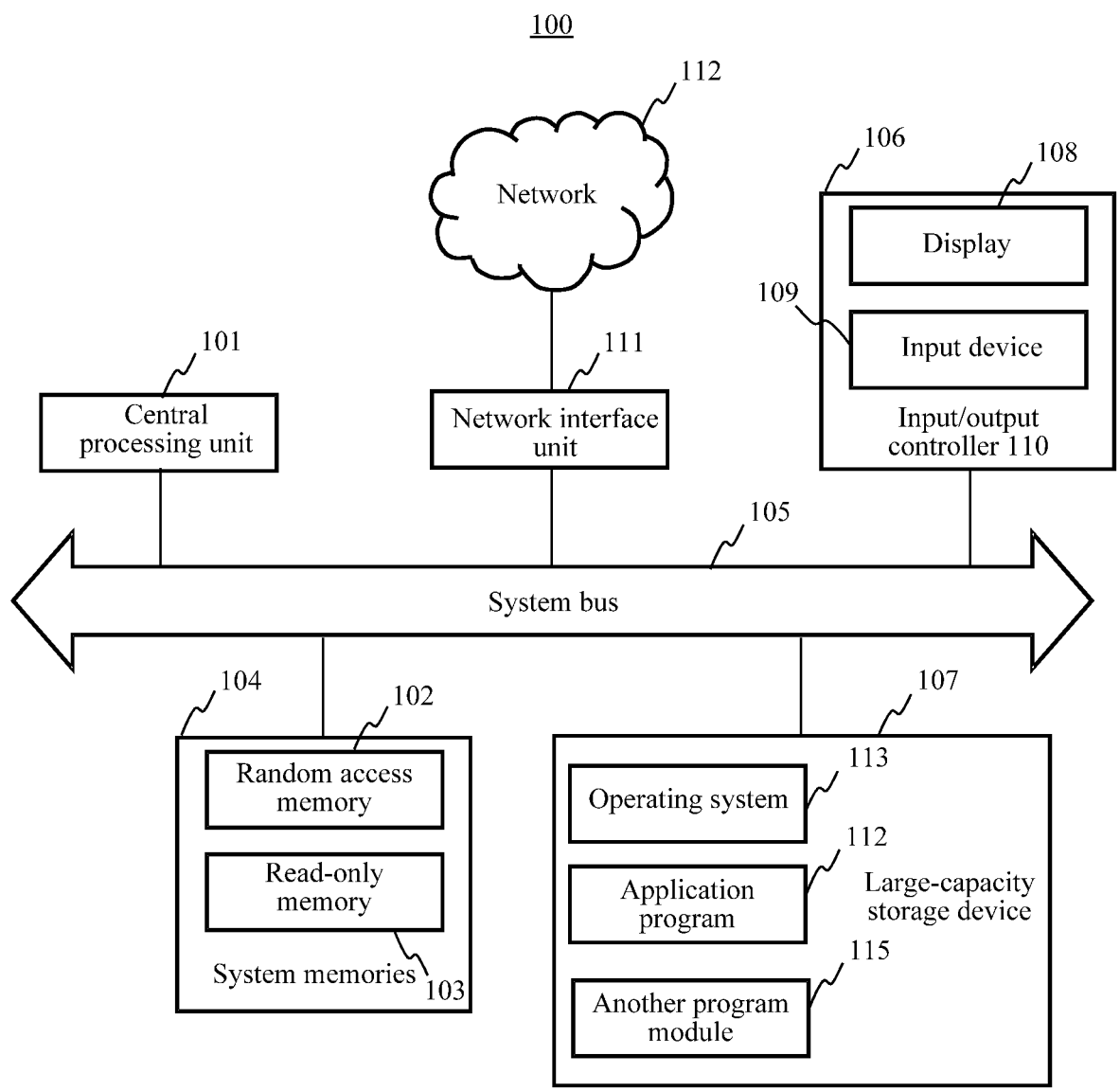
FIG. 1 is a block diagram of a server involved in a face model matrix training method according to embodiments of the present disclosure.

The face model matrix training method involved in the embodiments of the present disclosure may be implemented by a server 100. Specifically, referring to FIG. 1, the server 100 includes a central processing unit (CPU) 101, system memories 104 including a random access memory (RAM) 102 and a read-only memory (ROM) 103, and a system bus 105 connecting the system memories 104 and the central processing unit 101. The server 100 further includes a basic input/output system (I/O system) 106 facilitating information transmission among devices in the computer, and a large-capacity storage device 107 configured to store an operating system 113, an application program 112, and another program module 115.

The basic input/output system 106 includes a display 108 configured to display information and an input device such as a mouse or a keyboard that is configured for information inputting by a user. The display 108 and the input device 109 are both connected to the central processing unit 101 by using an input and output controller 110 connected to the system bus 105. The basic input/output system 106 may further include the input and output controller 110, for receiving and processing an input from multiple other devices such as a keyboard, a mouse, or an electronic stylus. Similarly, the input and output controller 110 further provides an output to a display, a printer, or another type of output device.

The large-capacity storage device 107 is connected to the central processing unit 101 by using a large-capacity-storage controller (not shown) connected to the system bus 105. The large-capacity storage device 107 and an associated computer readable medium provide non-volatile storage for the server 100. That is, the large-capacity storage device 107 may include a computer readable medium (not shown) such as a hard disk drive or a CD-ROM driver.

Without loss of generality, the computer readable medium may include a computer storage medium and a communications medium. The computer storage medium includes volatile and non-volatile, removable and non-removable media that store information such as computer readable instructions, data structures, program modules, or other data and that are implemented by using any method or technology. The computer storage medium includes a RAM, a ROM, an EPROM, an EEPROM, a flash memory, or another solid state storage technology, a CD-ROM, a DVD, or another optical storage, a magnetic cassette, a magnetic tape, a magnetic disk storage, or another magnetic storage device. Certainly, it may be known by a person skilled in the art that the computer storage medium is not limited to the foregoing exemplary types. The system memories 104 and the large-capacity storage device 107 may be collectively referred to as memories.

According to embodiments of the present disclosure, the server 100 may further be connected, by using a network such as the Internet, to a remote computer on the network for operation. That is, the server 100 may be connected to a network 112 by using a network interface unit 111 connected to the system bus 105, or may be connected to another type of network or remote computer system (not shown) by using the network interface unit 111.

The memory further includes one or more programs or program instructions, the one or more programs are stored in the memory, and the one or more programs are used to cause, e.g., one or more processors, to execute the face model matrix training method provided herein. The one or more processors may be coupled to the one or more memories.

Figure 2:
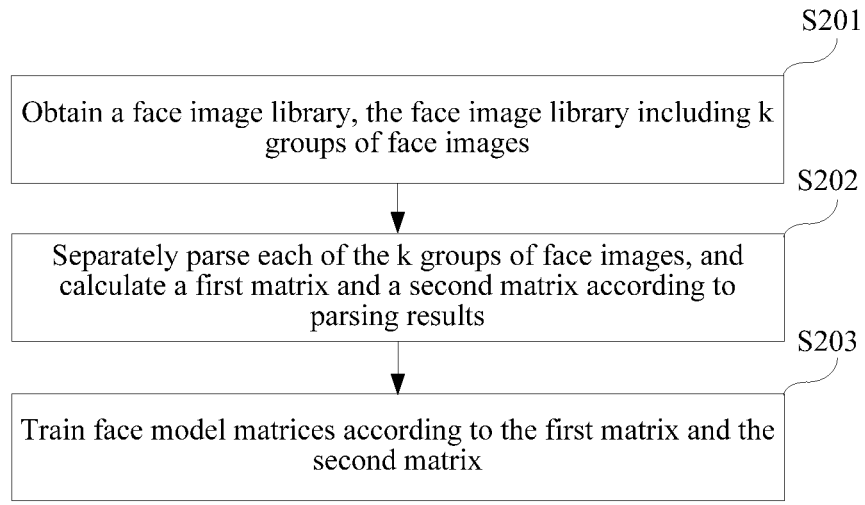
FIG. 2 is a method flowchart of an exemplary face model matrix training method according to embodiments of the present disclosure.

Referring to FIG. 2, FIG. 2 is a method flowchart of an exemplary face model matrix training method according to embodiments of the present disclosure. For illustration purposes, the exemplary face model matrix training method depicted in FIG. 2 may be implemented by the server shown in FIG. 1, although any suitable devices such as computing terminals may be used to implement the disclosed methods. For example, as shown in FIG. 2, the face model matrix training method may include, e.g., S201 to S203.

In S201, Obtaining a face image library, the face image library including k groups of face images.

Each group of face images includes at least one face image of at least one person, where k>2, and k is an integer.

In S202, Separately parsing each of the k groups of face images, and calculating a first matrix and a second matrix according to parsing results.

The first matrix is an intra-group covariance matrix of facial features of each group of face images, and the second matrix is an inter-group covariance matrix of facial features of the k groups of face images.

In S203, Training face model matrices according to the first matrix and the second matrix.

In the disclosed face model matrix training method, face images in a face image library are divided into k groups, each time a face image in only one group is loaded to a memory and parsed, then a first matrix and a second matrix are calculated according to parsing results, and face model matrices are trained according to the first matrix and the second matrix. As such, the technical problems, that relatively large memory is occupied when a terminal loads all face images in a face image library to a memory at the same time, is avoided. As disclosed, each time, face image(s) in only one group may be loaded to a memory, thereby reducing memory that needs to be occupied in a training process. In addition, because each time, only face image(s) in one group needs to be parsed, computational complexity of a terminal is also reduced.

Figure 3:
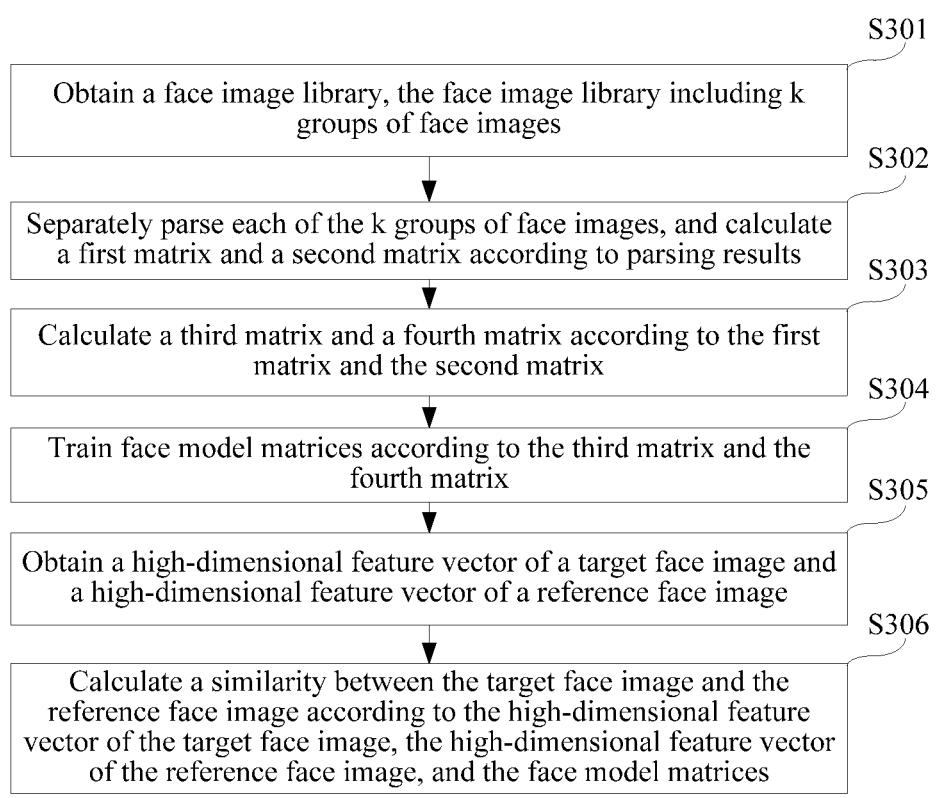
FIG. 3 is a method flowchart of another exemplary face model matrix training method according to embodiments of the present disclosure.

Referring to FIG. 3, FIG. 3 is a method flowchart of another exemplary face model matrix training method according to embodiments of the present disclosure. For illustration purposes, the exemplary face model matrix training method depicted in FIG. 3 may be implemented by the server shown in FIG. 1, although any suitable devices such as computing terminals may be used to implement the disclosed methods. For example, as shown in FIG. 3, the face model matrix training method may include S301 to S306.

In S301, Obtaining a face image library, the face image library including k groups of face images.

The exemplary face model matrix training method may be implemented by a terminal such as a mobile phone, a tablet computer, or a computer.

Each of the k groups of face images may include at least one face image of at least one person, where k>2, and k is an integer.

For example, the terminal may obtain an image library including m*N face images, where m is a quantity of persons in the face image library, and N is a quantity of face images of each person. The m persons are divided into k groups, and each group includes face images of m/k persons.

In S302, Separately parsing each of the k groups of face images, and calculating a first matrix and a second matrix according to parsing results.

The first matrix is an intra-group covariance matrix of facial features of each group of face images, and the second matrix is an inter-group covariance matrix of facial features of the k groups of face images.

In a specific embodiment, the method may be implemented as follows.

First, initializing a first matrix $S_g$ and a second matrix $S_s$.

Second, calculating H according to $S_s$, where $H=S_s^{-1}$, and calculating L according to $S_g$ and $S_s$, where $L=-(kS_g+S_s)^{-1}S_gS_g^{-1}$.

Third, obtaining a high-dimensional feature vector $x_i$ of a face image of an $i^{th}$ person and a high-dimensional feature vector $x_j$ of a face image of a $j^{th}$ person in each group of face images, where $0<i\leq n$, $0<j\leq n$, and $i\neq j$, and n is a quantity of persons in one group of face images. In an implementation, for each face image in each group of face images, the terminal may extract a high-dimensional feature vector of each face image. Specifically, the terminal may extract the high-dimensional feature vector by using a Local Binary Pattern (LBP) algorithm, a Histogram of Oriented Gradient (HOG) algorithm, a Gabor algorithm, and/or a Scale-Invariant Feature Transformation (SIFT) algorithm. In an actual implementation, the terminal may also extract the high-dimensional feature vector of each face image in any other suitable extraction manner.

In an example in which the terminal extracts a high-dimensional feature vector of a face image by using LBP for description, an exemplary method of extracting the high-dimensional feature vector of the face image may include the following.

A). Obtaining h scaled face images, where the h scaled face images are images that are obtained after a target face image is separately scaled according to h preset multiples.

The terminal may separately scale the target face image according to each of the h preset multiples, and then obtain h scaled target face images, where h is a positive integer, and the h preset multiples may be evenly distributed. In addition, the scaling in this embodiment includes scaling down the target face image.

B). For each of the face image and the h scaled face images, extracting face key points in the face image are determined, and LBP feature vectors at the face key points.

This may include, for example:

(a). recognizing a face frame in a target face image;

(b). positioning five facial features of a face in the face frame, to obtain face key points, where the face key points may include the left and right eyebrows, the left and right eyes, the nose, the left and right mouth corners, and the like; and (c). for each face key point, extracting, in a preset area centering on the face key point, LBP features in the preset area.

Optionally, the terminal may extract the LBP features in the preset area by using Uniform encoding, to obtain an LBP feature histogram. The preset area may be an a*a area, where a is a positive integer. Optionally, the terminal may extract an LBP feature in each cell in the preset area by using Uniform encoding.

C). Determining an LBP feature vector of the face image through combination according to the extracted LBP feature vectors of the face key points.

After the terminal or a suitable device performs extraction on each face image, the terminal may extract u LBP features.

After the terminal separately performs extraction on the target face image and the h scaled target face images, the terminal may obtain Y LBP features, where $Y=u*(h+1)$.

The terminal uses the extracted LBP features as parameters in the LBP feature vector, and then obtains, through combination, the LBP feature vector including the LBP features. Optionally, the terminal may use an LBP feature extracted from each face image as one row of one column in the LBP feature vector, and then obtain the LBP feature vector including (h+1) rows or (h+1) columns.

D). Calculating a high-dimensional feature vector of the face image according to the LBP feature vector.

When the LBP feature vector of the face image is $x_r$, calculating the high-dimensional feature vector of the face image according to the LBP feature vector may include:

(a). performing Principal Component Analysis (PCA) dimensionality reduction on $x_r^T x_r$, and reserving the first I dimension features, to obtain a dimension-reduced matrix P, where I is a positive integer;

(b). calculating $x_p=Px_r$ for $x_r$;

(c). performing Latent Dirichlet Allocation (LDA) dimensionality reduction on $x_p$, to obtain a dimension-reduced matrix L; and (d). calculating $x=Lx_p$ for $x_p$, where x is the high-dimensional feature vector of the target face image.

G is greater than a first threshold and less than a second threshold, and generally, I may be 1440. PCA dimensionality reduction is a dimensionality reduction method commonly used in image processing, where an original feature vector is mapped to a low-dimensional space by means of linear transformation.

At this point, the terminal may obtain the high-dimensional feature vector $x_i$ of $i^{th}$ face and the high-dimensional feature vector $x_j$ of the $j^{th}$ face image in each group of face images.

Optionally, in another exemplary implementation, calculating the high-dimensional feature vector of the face image according to the LBP feature vector may include the following.

(1). For each group of face images, calculating high-dimensional feature vectors of face images in the group.

Any calculation manner described above can be used and included.

(2). Calculating a mean of the high-dimensional feature vectors of the face images.

After the terminal calculates high-dimensional feature vectors of face images in a group, the terminal may calculate a mean of the high-dimensional feature vectors of the face images.

(3). For each face image in the group, subtracting the mean from the high-dimensional feature vector of the face image, to obtain a high-dimensional feature vector of the face image obtained after mean normalization, also referred to as a mean normalized high-dimensional feature vector of the face image.

(4). Determining the mean normalized high-dimensional feature vector of the face image as a high-dimensional feature vector of the face image.

Fourth, calculating $g_i$ according to H, L, $S_g$, and $x_i$, where $g_i=\Sigma_{i=1}^{k}S_g(H+kL)x_i$, and calculating $S_{ij}$ according to H, L, $x_i$, and $x_j$, where $S_{ij}=x_j+\Sigma_{i=1}^{k}S_sLx_i$.

Fifth, updating $S_g$ according to $g_i$, where $$S_g = con(g) = k^{-1}\sum_i g_i g_i^T,$$

and updating $S_s$ according to $S_{ij}$, where $$S_s = con(s) = k^{-1}\sum_i \sum_j S_{ij}S_{ij}^T,$$

$g_i^T$ is a transposed vector of $g_i$, and $S_{ij}^T$ is a transposed vector of $S_{ij}$.

Sixth, obtaining $S_g$ and $S_s$, if $S_g$ and $S_s$ are convergent.

Seventh, performing the step of calculating H according to $S_s$ and calculating L according to $S_g$ and $S_s$ again, if $S_g$ and $S_s$ are not convergent.

In S303, Calculating a third matrix and a fourth matrix according to the first matrix and the second matrix.

The third matrix is a covariance matrix of facial features in the face image library, and the fourth matrix is a covariance matrix among facial features of different persons in the face image library.

Optionally, in S303:

First, Calculating the third matrix $S_\mu$ according to the first matrix that is $S_g$ and the second matrix that is $S_s$, where $S_u=con(u)=S_g+S_s$.

Second, initializing the fourth matrix $S_\varepsilon$, where $S_\varepsilon$ may include samples of all the face images in the face image library, that is, include m*N samples without limitation.

Third, calculating F according to $S_\mu$, where $F=S_\mu^{-1}$, and calculating G according to $S_\mu$ and $S_\varepsilon$, where $G=-(mS_\mu+S_\varepsilon)^{-1}S_\mu S_\varepsilon^{-1}$, and m is a quantity of persons corresponding to the face images in the face image library.

Fourth, calculating a Gaussian distribution mean $\mu_i$ of the $i^{th}$ person in the face image library according to F and G, where $\mu_i=\Sigma_{i=1}^{m}S_\mu(F+mG)x_i$, and calculating a joint distribution covariance matrix $\varepsilon_{ij}$ of the $i^{th}$ person and the $j^{th}$ person according to F and G, where $\varepsilon_{ij}=x_j+\Sigma_{i=1}^{m}S_\varepsilon Gx_i$, $x_i$ is the high-dimensional feature vector of the $i^{th}$ person, and $x_j$ is the high-dimensional feature vector of the $j^{th}$ person.

Fifth, updating $S_\mu$ according to $\mu_i$, and updating $S_\varepsilon$ according to $\varepsilon_{ij}^T$ and $\varepsilon_{ij}$, where $$S_\mu = \text{cov}(\mu) = m^{-1}\sum_i \mu_i\mu_i^T, \quad S_\varepsilon = \text{cov}(\varepsilon) = m^{-1}\sum_i\sum_j \varepsilon_{ij}\varepsilon_{ij}^T,$$

$\mu_i^T$ is a transposed vector of $\mu_i$, and $\varepsilon_{ij}^T$ is a transposed vector of $\varepsilon_{ij}$.

Sixth, obtaining $S_\mu$ and $S_\varepsilon$, if $S_\mu$ and $S_\varepsilon$ are convergent.

Seventh, performing the step of calculating F according to $S_\mu$ and calculating G according to $S_\mu$ and $S_\varepsilon$ again, if $S_\mu$ and $S_\varepsilon$ are not convergent.

In S304, Training face model matrices according to the third matrix and the fourth matrix.

Optionally, the face model matrices may be obtained through training according to the third matrix $S_\mu$, the fourth matrix $S_\varepsilon$, F that is obtained when $S_\mu$ and $S_\varepsilon$ are convergent, and G that is obtained when $S_\mu$ and $S_\varepsilon$ are convergent.

The face model matrices are $A=(S_\mu+S_\varepsilon)^{-1}-(F+G)$ and $G=-(mS_\mu+S_\varepsilon)^{-1}S_\mu S_\varepsilon^{-1}$.

In S305, obtaining a high-dimensional feature vector of a target face image and a high-dimensional feature vector of a reference face image.

After obtaining the trained face model matrices through training, the terminal may perform face recognition according to the face model matrices.

Specifically, the terminal may obtain the high-dimensional feature vector of the target face image to be recognized, and obtain the high-dimensional feature vector of the reference face image. Optionally, the terminal may obtain the high-dimensional feature vectors through extraction by using an LBP algorithm, a HOG algorithm, a Gabor algorithm, or a SIFT algorithm.

In S306, Calculating a similarity between the target face image and the reference face image according to the high-dimensional feature vector of the target face image, the high-dimensional feature vector of the reference face image, and the face model matrices.

The similarity is: $r(x_1,x_2)=x_1^T Ax_1+x_2^T Ax_2-2x_1^T Gx_2$.

$x_1$ is the high-dimensional feature vector of the target face image, $x_2$ is the high-dimensional feature vector of the reference face image, $x_1^T$ is a transposed vector of $x_1$, $x_2^T$ is a transposed vector of $x_2$, and A and G are the face model matrices.

Optionally, before calculating the similarity, the terminal may further perform the following:

First, obtaining a mean M of all features in the face image library, for example, by obtaining a high-dimensional feature vector of each face image in the face image library, and calculating the mean M of all the features according to the obtained high-dimensional feature vectors. Optionally, the terminal may obtain the high-dimensional feature vector of each face image through extraction by using an LBP algorithm, a HOG algorithm, a Gabor algorithm, or a SIFT algorithm. This is not limited in this embodiment.

Second, performing a mean normalization processing on $x_1$ and $x_2$. Specifically, $x_1=x_1-M$ and $x_2=x_2-M$.

By performing the mean normalization processing on $x_1$ and $x_2$, $x_1$ and $x_2$ may be distributed centered by 0. This improves calculation efficiency of the similarity.

In addition, for illustration purposes, the face recognition is described by performing on the target face image by using the similarity. Optionally, after the terminal calculates the similarity, the terminal may further calculate a variance between the high-dimensional feature vector of the target face image and the high-dimensional feature vector of the reference face image, and then perform face recognition by using the calculated variance.

For calculating the variance:

First, obtaining a mean r1 and a variance $s_1$ of high-dimensional feature vectors of a same person in the face image library.

For the m*N face images in the face image library, among n face images of a same person, a similarity $r(x_1,x_2)$ between any two face images is calculated, to obtain (N−1) $r(x_1,x_2)$. For the m persons in the face image library, (N−1)*m $f(x_1,x_2)$ in total are obtained. The mean r1 and the variance $s_1$ of the $(N-1)*m$ $r(x_1,x_2)$ are calculated.

Second, calculating the variance according to the calculated means r1, the variances $s_1$, and the similarities, where the variance s is:

$$s = \frac{r(x_1, x_2) - r_1}{3s_1} * 100.$$

After the terminal calculates the variance s, the terminal may normalize the calculated s to the range 0 to 100. The size of s indicates a probability that the target face image and the reference face image are a same person. In other words, s is a confidence coefficient with a value between 1 and 100. A larger s indicates a high probability that the two face images are a same person.

In an actual implementation, a threshold may be set. When s is greater than the preset threshold, it is determined that the target face image and the reference face image are a same person. When s is less than the preset threshold, it is determined that the target face image and the reference face image are not a same person. In an actual implementation, the preset threshold is a number that is not less than 50 and is not greater than 100. A designer may set the threshold according to required recognition accuracy. Specifically, if the required accuracy is relatively high, the threshold is set to be a relatively large value, for example, 90, and if the required accuracy is relatively low, the threshold may be set to be a relatively small value, for example, 60.

In various embodiments, S305 and S306 may be optional.

In this manner, in the face model matrix training method provided in this embodiment, face images in a face image library are divided into k groups, a face image in only one group is loaded to a memory each time and parsed, then a first matrix and a second matrix are calculated according to parsing results, and face model matrices are trained according to the first matrix and the second matrix. As such, the technical problems, that relatively large memory is occupied when a terminal loads all face images in a face image library to a memory at the same time, is avoided. As disclosed, each time, face image(s) in only one group may be loaded to a memory, thereby reducing memory that needs to be occupied in a training process. In addition, because each time, only face image(s) in one group needs to be parsed, computational complexity of a terminal is also reduced.

Figure 4:
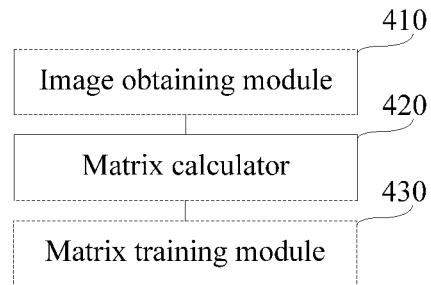
FIG. 4 is a structural block diagram of an exemplary face model matrix training apparatus according to embodiments of the present disclosure.

Referring to FIG. 4, FIG. 4 is a structural block diagram of an exemplary face model matrix training apparatus according to embodiments of the present disclosure. The exemplary face model matrix training apparatus may include: an image obtaining module 410, a matrix calculator 420, and a matrix training module 430.

The image obtaining module 410 is configured to obtain a face image library, the face image library including k groups of face images, and each group of face images including at least one face image of at least one person, k>2, and k being an integer.

The matrix calculator 420 is configured to: separately parse each of the k groups of face images, and calculate a first matrix and a second matrix according to parsing results, the first matrix being an intra-group covariance matrix of facial features of each group of face images, and the second matrix being an inter-group covariance matrix of facial features of the k groups of face images.

The matrix training module 430 is configured to train face model matrices according to the first matrix and the second matrix calculated by the matrix calculator 420.

As such, by providing the face model matrix training apparatus, face images in a face image library are divided into k groups, a face image in only one group is loaded to a memory each time and parsed, then a first matrix and a second matrix are calculated according to parsing results, and face model matrices are trained according to the first matrix and the second matrix. As such, the technical problems, that relatively large memory is occupied when a terminal loads all face images in a face image library to a memory at the same time, is avoided. As disclosed, each time, face image(s) in only one group may be loaded to a memory, thereby reducing memory that needs to be occupied in a training process. In addition, because each time, only face image(s) in one group needs to be parsed, computational complexity of a terminal is also reduced.

Figure 5:
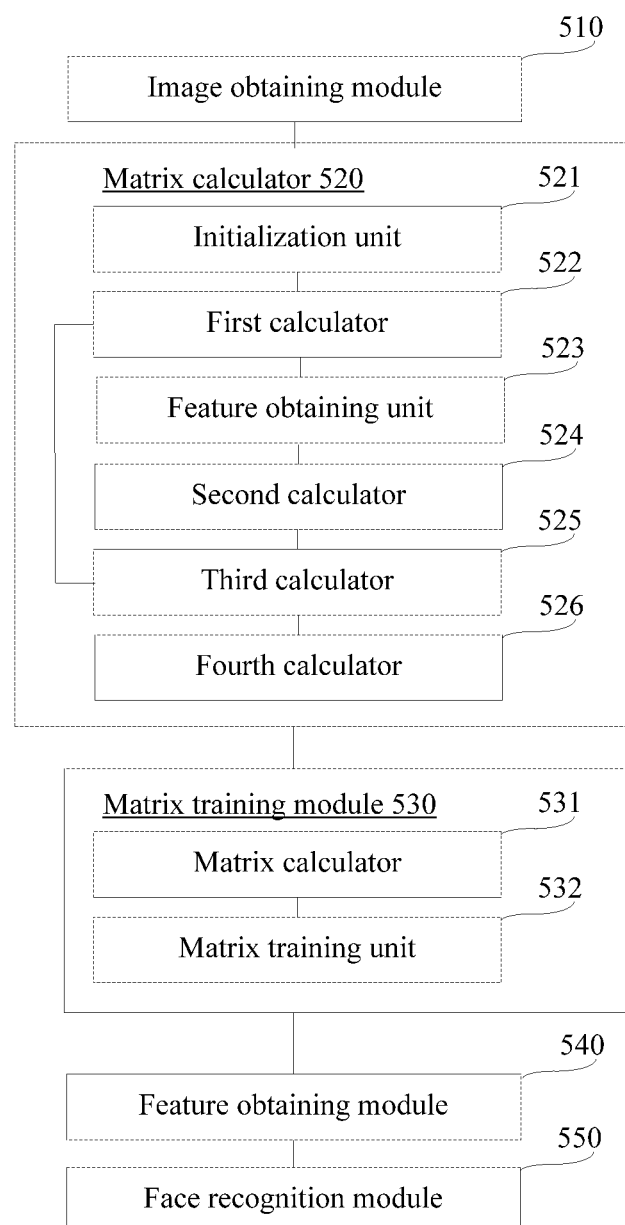
FIG. 5 is a structural block diagram of another exemplary face model matrix training apparatus according to embodiments of the present disclosure.

Referring to FIG. 5, FIG. 5 is a structural block diagram of an exemplary face model matrix training apparatus according to embodiments of the present disclosure. The face model matrix training apparatus may include: an image obtaining module 510, a matrix calculator 520, and a matrix training module 530.

The image obtaining module 510 is configured to obtain a face image library, the face image library including k groups of face images, and each group of face images including at least one face image of at least one person, k>2, and k being an integer.

The matrix calculator 520 is configured to: separately parse each of the k groups of face images, and calculate a first matrix and a second matrix according to parsing results, the first matrix being an intra-group covariance matrix of facial features of each group of face images, and the second matrix being an inter-group covariance matrix of facial features of the k groups of face images.

The matrix training module 530 is configured to train face model matrices according to the first matrix and the second matrix calculated by the matrix calculator 520.

Optionally, the matrix calculator 520 includes:

an initialization unit 521, configured to initialize the first matrix $S_g$ and the second matrix $S_s$;

a first calculator 522, configured to: calculate H according to $S_s$, where $H=S_s^{-1}$, and calculate L according to $S_g$ and $S_s$, where $L=-(kS_g+S_s)^{-1}S_g S_s^{-1}$;

a feature obtaining unit 523, configured to obtain a high-dimensional feature vector $x_i$ of a face image of the $i^{th}$ person and a high-dimensional feature vector $x_j$ of a face image of the $j^{th}$ person in each group of face images, where $0<i\le n$, $0<j\le n$, and $i\ne j$, and n is a quantity of persons in one group of face images;

a second calculator 524, configured to: calculate $g_i$ according to H, L, $S_g$, and $x_i$, where $g_i=\Sigma_{i=1}^{k}S_g(H+kL)x_i$, and calculate $S_{ij}$ according to H, L, $x_i$, and $x_j$, where $S_{ij}=x_j+\Sigma_{i=1}^{k}S_s L x_i$;

a third calculator 525, configured to: update $S_g$ according to $g_i$, where $$S_g = con(g) = k^{-1}\sum_i g_i g_i^T,$$

and update $S_s$ according to $S_{ij}$, where $$S_s = con(s) = k^{-1}\sum_i \sum_j S_{ij} S_{ij}^T,$$

$g_i^T$ is a transposed vector of $g_i$, and $S_{ij}^T$ is a transposed vector of $S_{ij}$; and a fourth calculator 526, configured to obtain $S_g$ and $S_s$, if $S_g$ and $S_s$ calculated by the third calculator 525 are convergent, where:

the first calculator 522 is further configured to perform the step of calculating H according to $S_s$ and calculating L according to $S_g$ and $S_s$ again, if $S_g$ and $S_s$ calculated by the third calculator are not convergent.

Optionally, the feature obtaining unit 523 is further configured to:

for each group of face images, calculate high-dimensional feature vectors of face images in the group;

calculate a mean of the high-dimensional feature vectors of the face images;

for each face image in the group, subtract the mean from the high-dimensional feature vector of the face image, to obtain a mean-normalized high-dimensional feature vector of the face image; and determine the mean-normalized high-dimensional feature vector of the face image as a high-dimensional feature vector of the face image.

Optionally, the matrix training module 530 includes:

a matrix calculator 531, configured to calculate a third matrix and a fourth matrix according to the first matrix and the second matrix, where the third matrix is a covariance matrix of facial features in the face image library, and the fourth matrix is a covariance matrix among facial features of different persons in the face image library; and a matrix training unit 532, configured to train the face model matrices according to the third matrix and the fourth matrix calculated by the matrix calculator 531.

Optionally, the matrix calculator 531 is further configured to:

calculate the third matrix $S_\mu$ according to the first matrix that is $S_g$ and the second matrix that is $S_s$, where $S_\mu = \text{con}(u) = S_g + S_s$;

initialize the fourth matrix $S_\varepsilon$;

calculate F according to $S_\mu$, where $F = S_\mu^{-1}$, and calculate G according to $S_\mu$ and $S_\varepsilon$, where $G = -(mS_\mu + S_\varepsilon)^{-1} S_\mu S_\varepsilon^{-1}$, and m is a quantity of persons corresponding to the face images in the face image library;

calculate a Gaussian distribution mean $\mu_i$ of the $i^{th}$ person in the face image library according to F and G, where $\mu_i = \Sigma_{i=1}^{m} S_\mu (F+mG) x_i$, and calculate a joint distribution covariance matrix $\varepsilon_{ij}$ of the $i^{th}$ person and the $j^{th}$ person according to F and G, where $\varepsilon_{ij} = x_j + \Sigma_{i=1}^{m} S_\varepsilon G x_i$, $x_i$ is the high-dimensional feature vector of the $i^{th}$ person, and $x_j$ is the high-dimensional feature vector of the $j^{th}$ person;

update $S_\mu$ according to $\mu_i$, and update $S_\varepsilon$ according to $\varepsilon_{ij}^T$ and $\varepsilon_{ij}$, where $$S_\mu = \text{cov}(\mu) = m^{-1} \sum_i \mu_i \mu_i^T, \quad S_\varepsilon = \text{cov}(\varepsilon) = m^{-1} \sum_i \sum_j \varepsilon_{ij} \varepsilon_{ij}^T,$$

$\mu_i^T$ is a transposed vector of $\mu_i$, and $\varepsilon_{ij}^T$ is a transposed vector of $\varepsilon_{ij}$;

obtain $S_\mu$ and $S_\varepsilon$, if $S_\mu$ and $S_\varepsilon$ are convergent; and perform the step of calculating F according to $S_\mu$ and calculating G according to $S_\mu$ and $S_\varepsilon$ again, if $S_\mu$ and $S_\varepsilon$ are not convergent.

Optionally, the matrix training unit 532 is further configured to:

obtain the face model matrices A and G through training according to: the third matrix $S_\mu$, the fourth matrix $S_\varepsilon$, F that is obtained when $S_\mu$ and $S_\varepsilon$ are convergent, and G that is obtained when $S_\mu$ and $S_\varepsilon$ are convergent, where:

the face model matrices are $A = (S_\mu + S_\varepsilon)^{-1} - (F+G)$ and $G = -(mS_\mu + S_\varepsilon)^{-1} S_\mu S_\varepsilon^{-1}$.

Optionally, the apparatus further includes:

a feature obtaining module 540, configured to obtain a high-dimensional feature vector of a target face image and a high-dimensional feature vector of a reference face image; and a face recognition module 550, configured to calculate a similarity between the target face image and the reference face image according to the high-dimensional feature vector of the target face image, the high-dimensional feature vector of the reference face image, and the face model matrices.

Optionally, the face recognition module 550 is further configured to:

calculate the similarity as $r(x_1, x_2) = x_1^T A x_1 + x_2^T A x_2 - 2 x_1^T G x_2$, where $x_1$ is the high-dimensional feature vector of the target face image, $x_2$ is the high-dimensional feature vector of the reference face image, $x_1^T$ is a transposed vector of $x_1$, $x_2^T$ is a transposed vector of $x_2$, and A and G are the face model matrices.

As such, by providing the disclosed face model matrix training apparatus, face images in a face image library are divided into k groups, a face image in only one group is loaded to a memory each time and parsed, then a first matrix and a second matrix are calculated according to parsing results, and face model matrices are trained according to the first matrix and the second matrix. As such, the technical problems, that relatively large memory is occupied when a terminal loads all face images in a face image library to a memory at the same time, is avoided. As disclosed, each time, face image(s) in only one group may be loaded to a memory, thereby reducing memory that needs to be occupied in a training process. In addition, because each time, only face image(s) in one group needs to be parsed, computational complexity of a terminal is also reduced.

Figure 6:
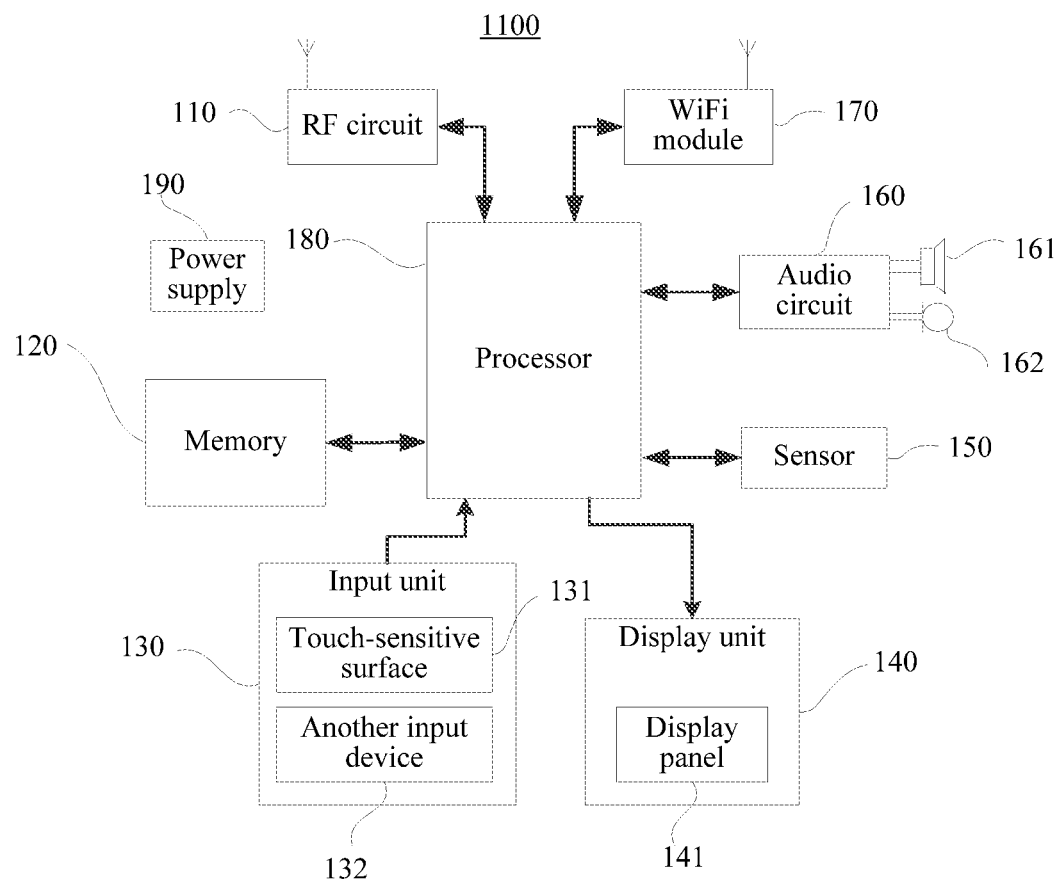
FIG. 6 is a structural block diagram of an exemplary face model matrix training terminal according to embodiments of the present disclosure.

FIG. 6 is a block diagram of an exemplary face model matrix training terminal 1100 according to embodiments of the present disclosure. Referring to FIG. 6, the terminal 1100 may include:

components such as a radio frequency (RF) circuit 110, a memory 120 including one or more computer readable storage media, an input unit 130, a display unit 140, a sensor 150, an audio circuit 160, a Wireless Fidelity (WiFi) module 170, a processor 180 including one or more processing cores, and a power supply 190. A person skilled in the art can understand that the structure of the terminal shown in FIG. 6 does not constitute a limitation to the terminal, and the terminal may include more or fewer components than those shown in the figure, or some components may be combined, or a different component deployment may be used.

The RF circuit 110 may be configured to receive and send signals in an information receiving and sending process or a call process. Particularly, after receiving downlink information from a base station, the RF circuit 110 delivers the downlink information to one or more processors 180 for processing, and sends related uplink data to the base station. Generally, the RF circuit 110 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 110 may also communicate with a network and another device by wireless communication. The wireless communication may use any communications standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory 120 may be configured to store a software program and module. The processor 180 runs the software program and module stored in the memory 120, to implement various functional applications and data processing. The memory 120 may mainly include a program storage area and a data storage area. The program storage area may store an operating system, an application program required by at least one function. The data storage area may store data created according to use of the terminal 1100, and the like. In addition, the memory 120 may include a high speed random access memory, and may also include a non-volatile memory, for example, at least one magnetic disk storage device, a flash memory device, or another volatile solid-state storage device. Correspondingly, the memory 120 may further include a memory controller, so as to provide access of the processor 180 and the input unit 130 to the memory 120.

The input unit 130 may be configured to receive input digit or character information, and generate a keyboard, mouse, joystick, optical, or track ball signal input related to the user setting and function control. Specifically, the input unit 130 may include a touch-sensitive surface 131 and another input device 132. The touch-sensitive surface 131, which may also be referred to as a touch screen or a touch panel, may collect a touch operation of a user on or near the touch-sensitive surface (such as an operation of a user on or near the touch-sensitive surface 131 by using any suitable object or accessory such as a finger or a stylus), and drive a corresponding connection apparatus according to a preset program. Optionally, the touch-sensitive surface 131 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 180. In addition, the touch controller can receive and execute a command sent from the processor 180. In addition, the touch-sensitive surface 131 may be a resistive, capacitive, infrared, or surface sound wave type touch-sensitive surface. In addition to the touch-sensitive surface 131, the input unit 130 may further include another input device 132. Specifically, the another input device 132 may include, but is not limited to, one or more of a physical keyboard, a functional key (such as a volume control key or a switch key), a track ball, a mouse, and a joystick.

The display unit 140 may be configured to display information input by the user or information provided to the user, and various graphical user interfaces of the terminal 1100. These graphical user interfaces may be formed by a graph, a text, an icon, a video, or any combination thereof. The display unit 140 may include a display panel 141. Optionally, the display panel 141 may be configured by using a liquid crystal display (LCD), an organic light-emitting diode (OLED) display, or the like. Further, the touch-sensitive surface 131 may cover the display panel 141. After detecting a touch operation on or near the touch-sensitive surface 131, the touch-sensitive surface 131 transfers the touch operation to the processor 180, so as to determine the type of the touch event. Then, the processor 180 provides a corresponding visual output on the display panel 141 according to the type of the touch event. Although the touch-sensitive surface 131 and the display panel 141 are used as two separate parts to implement input and output functions in FIG. 6, in some embodiments, the touch-sensitive surface 131 and the display panel 141 may be integrated to implement the input and output functions.

The terminal 1100 may further include at least one sensor 150, for example, an optical sensor, a motion sensor, and other sensors. Specifically, the optical sensor may include an ambient light sensor and a proximity sensor. The ambient light sensor can adjust luminance of the display panel 141 according to brightness of the ambient light. The proximity sensor can switch off the display panel 141 and/or enable backlight when the terminal 1100 is moved to the ear. As one type of motion sensor, a gravity acceleration sensor can detect magnitude of accelerations in various directions (generally on three axes), may detect magnitude and a direction of the gravity when the gravity acceleration sensor is still, and may be used for an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be provided on the terminal 1100, are not further described herein.

The audio circuit 160, a loudspeaker 161, and a microphone 162 may provide audio interfaces between a user and the terminal 1100. The audio circuit 160 may convert received audio data into an electric signal and transmit the electric signal to the loudspeaker 161. The loudspeaker 161 converts the electric signal into a sound signal for output. On the other hand, the microphone 162 converts a collected sound signal into an electric signal. The audio circuit 160 receives the electric signal and converts the electric signal into audio data, and outputs the audio data to the processor 180 for processing. Then, the processor 180 sends the audio data to, for example, another terminal device by using the RF circuit 110, or outputs the audio data to the memory 120 for further processing. The audio circuit 160 may further include an earplug jack, so as to provide communication between a peripheral earphone and the terminal 1100.

WiFi is a short distance wireless transmission technology. The terminal 1100 may help, by using the WiFi module 170, the user to receive and send e-mails, browse a webpage, access streaming media, and the like. The terminal 1100 provides wireless broadband Internet access for a user. Although FIG. 6 shows the WiFi module 170, it can be understood that the WiFi module 170 is not a necessary component of the terminal 1100, and when required, the WiFi module 170 may be omitted as long as the scope of the essence of the present disclosure is not changed.

The processor 180 is the control center of the terminal 1100, and is connected to various parts of the mobile phone by using various interfaces and lines. By running or executing the software program and/or module stored in the memory 120, and invoking data stored in the memory 120, the processor 180 performs various functions and data processing of the terminal 1100, thereby performing overall monitoring on the mobile phone. Optionally, the processor 180 may include one or more processing cores. For example, an application processor and a modem may be integrated in the processor 180. The application processor mainly processes an operating system, a user interface, an application program, and the like. The modem mainly processes wireless communication. It can be understood that the foregoing modem may also not be integrated in the processor 180.

The terminal 1100 further includes the power supply 190 (such as a battery) for supplying power to the components. For example, the power supply may be logically connected to the processor 180 by using a power management system, thereby implementing functions such as charging, discharging, and power consumption management by using the power management system. The power supply 190 may further include one or more of a direct current or alternating current power supply, a re-charging system, a power failure detection circuit, a power supply converter or inverter, a power supply state indicator, and any other components.

Although not shown in the figure, the terminal 1100 may further include a camera, a Bluetooth module, and the like, which are not further described herein. Specifically, in this embodiment, the display unit of the terminal is a touch screen display, and the terminal further includes a memory and one or more programs. The one or more programs are stored in the memory and configured to be executed by one or more processors. The one or more programs include instructions configured to perform the following operations: obtaining a face image library, the face image library including k groups of face images, and each group of face images including at least one face image of at least one person, k>2, and k being an integer; separately parsing each of the k groups of face images, and calculating a first matrix and a second matrix according to parsing results, the first matrix being an intra-group covariance matrix of facial features of each group of face images, and the second matrix being an inter-group covariance matrix of facial features of the k groups of face images; and training face model matrices according to the first matrix and the second matrix.

The one or more programs further include instructions configured to perform other operations in the face model matrix training method in FIG. 2 or FIG. 3.

It should be noted that, the division of the above functional modules is merely described for exemplary purposes when the face model matrix training apparatus provided in the foregoing embodiments trains a face model matrix. In actual applications, the functions may be allocated to different functional modules according to specific needs, that is, dividing the internal structure of the apparatus into different functional modules to complete all or some of the above described functions. In addition, the face model matrix training apparatus provided in the foregoing embodiments is based on the same concept as that of the method embodiments of the face model matrix training method. For a specific implementation process, refer to the method embodiments, and details are not described herein again.

The serial numbers of the foregoing embodiments of the present disclosure serve for a description purpose only, and do not indicate the superiority or inferiority of the embodiments.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

The foregoing descriptions are merely preferred embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A face model matrix training method, comprising:

obtaining a face image library, the face image library including multiple groups of face images, and each group of face images including at least one face image of at least one person;

separately parsing each group of the multiple groups of face images, and calculating a first matrix and a second matrix according to parsing results, the first matrix being an intra-group covariance matrix of facial features of each group of face images, and the second matrix being an inter-group covariance matrix of facial features of the multiple groups of face images, including:

initializing the first matrix and the second matrix;

calculating a first H according to the first matrix, and calculating a first L according to both the first matrix and the second matrix;

updating the first matrix according to high-dimensional feature vectors of face images of persons in a same group and according to the first H and the first L to obtain a first updated first matrix, and updating the second matrix according to high-dimensional feature vectors of face images of persons in different groups and according to the first L to obtain a first updated second matrix;

re-calculating the first H and the first L according to the first updated first matrix and the first updated second matrix to obtain a second H and a second L; and updating the first updated first matrix and the first updated second matrix according to the second H and the second L to respectively obtain second updated first matrix and second updated second matrix; and training face model matrices according to the second updated first matrix and the second updated second matrix, including:

calculating a third matrix and a fourth matrix according to the second updated first matrix and the second updated second matrix, wherein the third matrix is a covariance matrix of facial features in the face image library, and the fourth matrix is a covariance matrix among facial features of different persons in the face image library; and training the face model matrices according to the third matrix and the fourth matrix.

2. The method according to claim 1, wherein the face image library comprises k groups of face images, k being an integer greater than 2; and calculating the first matrix and the second matrix according to the parsing results comprises:

initializing the first matrix $S_g$ and the second matrix $S_s$;

calculating the first H according to $S_s$, wherein $H=S_s^{-1}$, and calculating the first L according to $S_g$ and $S_s$, wherein $L=-(kS_g+S_s)^{-1}S_gS_s^{-1}$;

obtaining a high-dimensional feature vector $x_i$ of a face image of an $i_{th}$ person and a high-dimensional feature vector $x_j$ of a face image of a $j^{th}$ person in each group of face images, wherein $0 \le i \le n$, $0 \le j \le n$, and $i \ne j$, and n is a quantity of persons in one group of face images;

calculating $g_i$ according to the first H, the first L, $S_g$, and $x_i$, wherein $g_i = \Sigma_{i=1}^{k} S_g (H+kL)x_i$, and calculating $S_{ij}$ according to the first H, the first L, $x_i$, and $x_j$, wherein $S_{ij} = x_j + \Sigma_{i=1}^{k} S_s L x_i$;

updating $S_g$ according to $g_i$, wherein $$S_g = con(g) = k^{-1} \sum_i g_i g_i^T,$$

and updating $S_s$ according to $S_{ij}$, wherein $$S_s = con(s) = k^{-1} \sum_i \sum_j S_{ij} S_{ij}^T,$$

$g_i^T$ is a transposed vector of $g_i$, and $S_{ij}^T$ is a transposed vector of $S_{ij}$;
and
re-calculating the first H according to $S_s$ and re-calculating the first L according to $S_g$ and $S_s$ to obtain the second H and the second L.

3. The method according to claim 2, wherein the obtaining a high-dimensional feature vector $x_i$ of a face image of an $i^{th}$ face image and a high-dimensional feature vector $x_j$ of a face image of a $j^{th}$ face image in each group of face images comprises:
for each group of face images, calculating high-dimensional feature vectors of face images in the group;
calculating a mean of the high-dimensional feature vectors of the face images;
for each face image in the group, subtracting the mean from the high-dimensional feature vector of the face image, to obtain a mean-normalized high-dimensional feature vector of the face image; and
determining the mean-normalized high-dimensional feature vector of the face image as a high-dimensional feature vector of the face image.

4. The method according to claim 1, wherein the calculating a third matrix and a fourth matrix according to the first matrix and the second matrix comprises: calculating the third matrix $S_\mu$ according to the first matrix $S_g$ and the second matrix $S_s$, wherein $S_\mu = con(u) = S_g + S_s$;
initializing the fourth matrix $S_\varepsilon$;
calculating F according to $S_\mu$, wherein $F = S_\mu^{-1}$, and calculating G according to $S_\mu$ and $S_\varepsilon$, wherein $G = -(mS_\mu + S_\varepsilon)^{-1} S_\mu S_\varepsilon^{-1}$, and m is a quantity of persons corresponding to the face images in the face image library;
calculating a Gaussian distribution mean $\mu_i$ of an $i^{th}$ person in the face image library according to F and G, wherein $\mu_i = \Sigma_{i=1}^m S_\mu(F + mG)x_i$, and calculating a joint distribution covariance matrix $\varepsilon_{ij}$ of the $i^{th}$ person and a $j^{th}$ person according to F and G, wherein $\varepsilon_{ij} = x_j + \Sigma_{i=1}^m S_\varepsilon G x_i$, $x_i$ is the high-dimensional feature vector of the $i^{th}$ person, and $x_j$ is the high-dimensional feature vector of the $j^{th}$ person; and
updating $S_\mu$ according to $\mu_i$, and updating $S^\varepsilon$ according to $\varepsilon_{ij}^T$ and $\varepsilon_{ij}$, wherein $$S_\mu = cov(\mu) = m^{-1} \sum_i \mu_i \mu_i^T, \ S_\varepsilon = cov(\varepsilon) = m^{-1} \sum_i \sum_j \varepsilon_{ij} \varepsilon_{ij}^T,$$

$\mu_i^T$ is a transposed vector of $\mu_i$, and $\varepsilon_{ij}^T$ is a transposed vector of $\varepsilon_{ij}$.

5. The method according to claim 4, wherein the training the face model matrices according to the third matrix and the fourth matrix comprises:

obtaining the face model matrices A and G, through training according to: the third matrix $S_\mu$, the fourth matrix $S_\varepsilon$, F, and G, wherein the face model matrices are $A = (S_\mu + S_\varepsilon)^{-1} - (F+G)$ and $G = -(mS_\mu + S_\varepsilon)^{-1} S_\mu S_\varepsilon^{-1}$.

6. The method according to claim 1, further comprising:
obtaining a high-dimensional feature vector of a target face image and a high-dimensional feature vector of a reference face image; and
calculating a similarity between the target face image and the reference face image according to the high-dimensional feature vector of the target face image, the high-dimensional feature vector of the reference face image, and the face model matrices.

7. The method according to claim 6, wherein the calculating a similarity between the target face image and the reference face image according to the high-dimensional feature vector of the target face image, the high-dimensional feature vector of the reference face image, and the face model matrices comprises:
calculating the similarity as $r(x_1, x_2) = x_1^T A x_1 + x_2^T A x_2 - 2x_1^T G x_2$, wherein $x_1$ is the high-dimensional feature vector of the target face image, $x_2$ is the high-dimensional feature vector of the reference face image, $x_1^T$ is a transposed vector of $x_1$, $x_2^T$ is a transposed vector of $x_2$, and A and G are the face model matrices.

8. A face model matrix training apparatus, comprising: a memory; and a processor, coupled to the memory and configured to:
obtain a face image library, the face image library comprising multiple groups of face images, and each group of face images comprising at least one face image of at least one person;
separately parse each group of the multiple groups of face images, and calculate a first matrix and a second matrix according to parsing results, the first matrix being an intra-group covariance matrix of facial features of each group of face images, and the second matrix being an inter-group covariance matrix of facial features of the k groups of face images, including:
initializing the first matrix and the second matrix;
calculating a first H according to the first matrix, and calculating a first L according to both the first matrix and the second matrix;
updating the first matrix according to high-dimensional feature vectors of face images of persons in a same group and according to the first H and the first L to obtain a first updated first matrix, and updating the second matrix according to high-dimensional feature vectors of face images of persons in different groups and according to the first L to obtain a first updated second matrix;
re-calculating the first H and the first L according to the first updated first matrix and the first updated second matrix to obtain a second H and a second L; and
updating the first updated first matrix and the first updated second matrix according to the second H and the second L to respectively obtain second updated first matrix and second updated second matrix; and
train face model matrices according to the second updated first matrix and the second updated second matrix, including:
calculating a third matrix and a fourth matrix according to the second updated first matrix and the second updated second matrix, wherein the third matrix is a covariance matrix of facial features in the face image library, and the fourth matrix is a covariance matrix among facial features of different persons in the face image library; and training the face model matrices according to the third matrix and the fourth matrix.

9. The apparatus according to claim 8, wherein the face image library comprises k groups of face images, k being an integer greater than 2; and the processor further is configured to:

initialize the first matrix $S_g$ and the second matrix $S_s$;

calculate the first H according to $S_s$, wherein $H=S_s^{-1}$, and calculate the first L according to $S_g$ and $S_s$, wherein $L=-(kS_g+S_s)^{-1}S_g S_s^{-1}$;

obtain a high-dimensional feature vector $x_i$ of a face image of an $i^{th}$ person and a high-dimensional feature vector $x_j$ of a face image of a $j^{th}$ person in each group of face images, wherein $0<i\le n$, $0<j\le n$, and $i\ne j$, and n is a quantity of persons in one group of face images;

calculate $g_i$ according to the first H, the first L, $S_g$, and $x_i$, wherein $g_i=\Sigma_{i=1}^{k} S_g(H+kL)x_i$, and calculate $S_{ij}$ according to the first H, the first L, $x_i$, and $x_j$, wherein $S_{ij}=x_j+\Sigma_{i=1}^{k} S_s L x_i$;

update $S_g$ according to $g_i$, wherein $$S_g = con(g) = k^{-1} \sum_i g_i g_i^T,$$

and update $S_s$ according to $S_{ij}$, wherein $$S_s = con(s) = k^{-1} \sum_i \sum_j S_{ij} S_{ij}^T,$$

$g_i^T$ is a transposed vector of $g_i$, and $S_{ij}^T$ is a transposed vector of $S_{ij}$; and re-calculate the first H according to $S_s$ and re-calculate the first L according to $S_g$ and $S_s$ to obtain the second H and the second L.

10. The apparatus according to claim 9, wherein the processor is further configured to:

for each group of face images, calculate high-dimensional feature vectors of face images in the group;

calculate a mean of the high-dimensional feature vectors of the face images;

for each face image in the group, subtract the mean from the high-dimensional feature vector of the face image, to obtain a mean-normalized high-dimensional feature vector of the face image; and determine the mean-normalized high-dimensional feature vector of the face image as a high-dimensional feature vector of the face image.

11. The apparatus according to claim 8, wherein the processor is further configured to:

calculate the third matrix $S_\mu$ according to the first matrix $S_g$ and the second matrix $S_s$, wherein $S_\mu=con(u)=S_g S_s$;

initialize the fourth matrix $S_\varepsilon$;

calculate F according to $S_\mu$, wherein $F=S_\mu^{-1}$, and calculate G according to $S_\mu$ and $S_\varepsilon$, wherein $G=-(mS_\mu+S_\varepsilon)^{-1}S_\mu S_\varepsilon^{-1}$, and m is a quantity of persons corresponding to the face images in the face image library;

calculate a Gaussian distribution mean $\mu_i$ of an $i^{th}$ person in the face image library according to F and G, wherein $\mu_i=\Sigma_{i=1}^{m} S_\mu(F+mG)x_i$, and calculate a joint distribution covariance matrix $\varepsilon_{ij}$ of the $i^{th}$ person and a $j^{th}$ person according to F and G, wherein $\varepsilon_{ij}=x_j+\Sigma_{i=1}^{m} S_\varepsilon G x_i$, $x_i$ is the high-dimensional feature vector of the $i^{th}$ person, and $x_j$ is the high-dimensional feature vector of the $j^{th}$ person; and update $S_\mu$ according to $\mu_i$, and update $S_\varepsilon$ according to $\varepsilon_{ij}^T$ and $\varepsilon_{ij}$, wherein $$S_\mu = cov(\mu) = m^{-1} \sum_i \mu_i \mu_i^T, \quad S_\varepsilon = cov(\varepsilon) = m^{-1} \sum_i \sum_j \varepsilon_{ij} \varepsilon_{ij}^T,$$

$\varepsilon_i^T$ is a transposed vector of $\mu_i$, and $\varepsilon_{ij}^T$ is a transposed vector of $\varepsilon_{ij}$.

12. The apparatus according to claim 11, wherein the processor is further configured to:

obtain the face model matrices through training according to the third matrix $S_\mu$, the fourth matrix $S_\varepsilon$, F, and G, wherein the face model matrices are $A=(S_\mu+S_\varepsilon)_{-1}-(F+G)$ and $G=-(mS_\mu+S_\varepsilon)^{-1}S_\mu S_\varepsilon^{-1}$.

13. The apparatus according to claim 8, wherein the processor is further configured to:

obtain a high-dimensional feature vector of a target face image and a high-dimensional feature vector of a reference face image; and calculate a similarity between the target face image and the reference face image according to the high-dimensional feature vector of the target face image, the high-dimensional feature vector of the reference face image, and the face model matrices.

14. The apparatus according to claim 13, wherein the processor is further configured to:

calculate the similarity as $r(x_1,x_2)=x_1^T A x_1+x_2^T A x_2-2x_1^T G x_2$, wherein $x_1$ is the high-dimensional feature vector of the target face image, $x_2$ is the high-dimensional feature vector of the reference face image, $x_1^T$ is a transposed vector of $x_1$, $x_2^T$ is a transposed vector of $x_2$, and A and G are the face model matrices.

15. A non-transitory computer readable storage medium, comprising computer-executable program instructions for, when being executed by a processor, cause the processor to perform:

obtaining a face image library, the face image library comprising multiple groups of face images, and each group of face images comprising at least one face image of at least one person;

separately parsing each group of the multiple groups of face images, and calculating a first matrix and a second matrix according to parsing results, the first matrix being an intra-group covariance matrix of facial features of each group of face images, and the second matrix being an inter-group covariance matrix of facial features of the multiple groups of face images, including:

initializing the first matrix and the second matrix;

calculating a first H according to the first matrix, and calculating a first L according to both the first matrix and the second matrix;

updating the first matrix according to high-dimensional feature vectors of face images of persons in a same group and according to the first H and the first L to obtain a first updated first matrix, and updating the second matrix according to high-dimensional feature vectors of face images of persons in different groups and according to the first L to obtain a first updated second matrix;

re-calculating the first H and the first L according to the first updated first matrix and the first updated second matrix to obtain a second H and a second L; and updating the first updated first matrix and the first updated second matrix according to the second H and the second L to respectively obtain second updated first matrix and second updated second matrix; and training face model matrices according to the second updated first matrix and the second updated second matrix, including:

calculating a third matrix and a fourth matrix according to the second updated first matrix and the second updated second matrix, wherein the third matrix is a covariance matrix of facial features in the face image library, and the fourth matrix is a covariance matrix among facial features of different persons in the face image library; and training the face model matrices according to the third matrix and the fourth matrix.

16. The storage medium according to claim 15, wherein the face image library comprises k groups of face images, k being an integer greater than 2; and calculating the first matrix and the second matrix according to the parsing results comprises:

initializing the first matrix $S_g$ and the second matrix $S_s$;

calculating the first H according to $S_s$, wherein $H=S_s^{-1}$, and calculating the first L according to $S_g$ and $S_s$, wherein $L=-(kS_g+S_s)^{-1}S_g S_s^{-1}$;

obtaining a high-dimensional feature vector $x_i$ of a face image of an $i^{th}$ person and a high-dimensional feature vector $x_j$ of a face image of a $j^{th}$ person in each group of face images, wherein $0<n\le n$, $0<j\le n$, and $i\ne j$, and n is a quantity of persons in one group of face images;

calculating $g_i$ according to the first H, the first L, $S_g$, and $x_i$, wherein $g_i=\Sigma_{i=1}^{k} S_g (H+kL)x_i$, and calculating $S_{ij}$ according to the first H, the first L, $x_i$, and $x_j$, wherein $S_{ij}=x_j+\Sigma_{i=1}^{k}S_s L x_i$; and updating $S_g$ according to $g_i$, wherein $$S_g = con(g) = k^{-1}\sum_i g_i g_i^T,$$

and updating $S_s$ according to $S_{ij}$, wherein $$S_s = con(s) = k^{-1}\sum_i\sum_j S_{ij}S_{ij}^T,$$

$g_i^T$ is a transposed vector of $g_i$, and $S_{ij}^T$ is a transposed vector of $S_{ij}$.

17. The storage medium according to claim 16, wherein the obtaining a high-dimensional feature vector $x_i$ of a face image of an $i^{th}$ face image and a high-dimensional feature vector $x_j$ of a face image of a $j^{th}$ face image in each group of face images comprises:

for each group of face images, calculating high-dimensional feature vectors of face images in the group;

calculating a mean of the high-dimensional feature vectors of the face images;

for each face image in the group, subtracting the mean from the high-dimensional feature vector of the face image, to obtain a mean-normalized high-dimensional feature vector of the face image; and determining the mean-normalized high-dimensional feature vector of the face image as a high-dimensional feature vector of the face image.

* * * * *